United States Patent [19]

Dreyfus et al.

[11] Patent Number: 4,785,357
[45] Date of Patent: Nov. 15, 1988

[54] DEVICE FOR PHOTOCOPYING PARTS OF DOCUMENTS

[76] Inventors: Bertrand A. Dreyfus, 114 rue de Damiette, 91190 Gif-Sur-Yvette; Jaques Godart, 21 rue Nationale, F-91300 Massy, both of France

[21] Appl. No.: 945,997

[22] Filed: Dec. 24, 1986

[30] Foreign Application Priority Data

Dec. 27, 1985 [FR] France .................. 85 19281

[51] Int. Cl.$^4$ .......... H04N 1/10; H04N 1/22
[52] U.S. Cl. .................. 358/285; 358/256; 358/286; 358/293; 382/59
[58] Field of Search ........ 358/285, 282, 286, 293, 358/294, 228; 235/432, 472; 355/82, 84; 382/59, 11

[56] References Cited

U.S. PATENT DOCUMENTS

| | | | |
|---|---|---|---|
| 3,325,821 | 6/1967 | Reese et al. | 346/104 |
| 3,832,686 | 8/1974 | Bilgutay | 382/11 X |
| 4,523,235 | 6/1985 | Rajchman | 358/256 |
| 4,574,317 | 3/1986 | Schuible | 382/59 X |
| 4,611,246 | 9/1986 | Nihei | 358/256 |
| 4,639,290 | 1/1987 | Kusaka | 358/285 X |
| 4,651,226 | 3/1987 | Motoori et al. | 358/228 X |

FOREIGN PATENT DOCUMENTS 0146472 6/1985 European Pat. Off. .
8008153 10/1981 France .
55-115773 11/1980 Japan .
2082874A 3/1982 United Kingdom .

OTHER PUBLICATIONS

"Electronic Engineering" 3/72, vol. 44, No. 529, pp. 35-37, Integrated Arrays Offer Many Advantages in O.C.R. Systems, D. Porter.

Primary Examiner—Howard W. Britton
Assistant Examiner—Victor R. Kostak
Attorney, Agent, or Firm—Cushman, Darby & Cushman

[57] ABSTRACT

The invention relates to a pocket-sized device for photocopying small parts of documents. A flat package (1) includes a first face (2) for reading the document by means of a charge coupled device for transferring charges (4, 18) and at least one incremental wheel (6), which as it rolls without sliding on the document furnishes a time base for the reading interval (24). It includes a second face (3) for reading, by means of a matrix printer (12), and at least one incremental wheel (11). At each reading interval, the data are stored in memory (16). For writing, the device is turned over, and the writing wheel (11) controls the transfer of data from memory (16) to the printer (12) via an amplifier-multiplexer (17). Application to taking notes by localized photocopying of a quotation in a text, an equation, or a diagram.

11 Claims, 2 Drawing Sheets

DEVICE FOR PHOTOCOPYING PARTS OF DOCUMENTS

BACKGROUND OF THE INVENTION

The present invention relates to a pocket-sized device for photocopying and printing parts of texts, diagrams, or images. The device according to the invention makes it possible to sample a phrase in a text, an equation, or a diagram, and to recopy these elements on paper to retain them, because of their interest for the user.

Photocopying is a very widespread means of reproduction at this time, but it does not enable partial reproduction of a document except on the condition that the portions of the document that are not to be reproduced are masked, or that the portion of interest is cut out of the complete photocopied document. On the other hand, the dimensions of the photocopying equipment must be compatible with those of the document to be photocopied and of the base material receiving the copy. Finally, although known photocopying equipment, even the most sophisticated, is sometimes portable, it is not truly pocket-sized; it cannot be carried on one's person, for instance in a pocket.

The subject of the invention is a miniaturized device, having a bulk and volume such that its user can have it with him at all times in his pocket, like a wallet. This device has at least two faces: a first face including an optical matrix pickup, which by traveling along in front of the document to be reproduced picks up the data and puts them into memory. A second face includes a matrix printing head, such as a dot matrix printing head. When the part of the document to be photocopied has been picked up by the optical pickup and put into memory, turning the device according to the invention over makes it possible to print this part onto a base material by means of the matrix printing head.

This pocket-sized device thus makes it possible to retain a quotation in a text, or a diagram and to take notes by means of partial localized photocopying, by posting them on a sheet of paper or a laboratory notebook, for example. Thus pickup and reading are effected, followed by the reproduction of only that portion of the document of which reproduction is desired.

The reading pickup, which effects the optical pickup of the portion of the document, also assures the electrical conversion of the optical signal: this is a linear pickup of the charge transfer device type, also know as a charge coupled device. This pick-up, which has a matrix structure, determines a line in the document, and each cell of the matrix identifies a zone of this line on the document and furnishes an electrical signal corresponding to white or black or half tones with a dynamic that enables retaining the features of the image.

The electrical signals emitted by the CCD matrix are read in parallel or serially and transferred to a memory in which they are stored. Whether reading is parallel or serial depends on the organization of the memory.

For printing the part of the document that has been read, the partial photocopying device is turned over. The data stored in memory are transferred to a matrix printing head, by way of an amplifier with multiplexing after the amplifier; the printing head has the same matrix structure as the CCD pickup and memory.

The time base or clock, in the course of all these operations, is furnished by a system of wheels, at least two in number, of which one wheel rolls without sliding on the document and the other rolls without sliding on the reproduction base material. These wheels, which have the same characteristics, are associated with known devices that furnish electrical pulses, corresponding to the reading—or writing—intervals, and the width of each interval is equal to the width of one line read by the CCD pickup.

SUMMARY OF THE INVENTION

More specifically, the invention comprises a pocket-sized device for photocopying parts of texts or diagrams, characterized in that it includes:

a matrix pickup for picking up and reading the part of the document to be reproduced;

an electronic device for putting data coming from the reading pickup into memory;

an amplifying and multiplexing device of the data coming from the memory;

a matrix printing system, controlled by the amplifier-multiplexer;

the matrix pickup and the matrix printing system having the same matrix arrangement;

a time base, which controls the clock controlling the transfers of data from the pickup to the memory and then from the memory to the printing system being furnished by the rotation of at least one incremental wheel, which rolls without sliding on the base material of the document to be reproduced.

BRIEF DESCRIPTION OF THE DRAWINGS

The invention will be better understood from the ensuing description of an exemplary embodiment of the pocket-sized photocopying device, this description relating to the attached drawing figures, which show.

DETAILED DESCRIPTION OF THE INVENTION

A brief recollection of the nature and characteristics of charge coupled devices or CCDs will make it possible to better understand the function of the device according to the invention as described below.

The structure of a CCD is that of an analog shift register. It comprises a network of electrodes disposed on silicon dioxide. Each electrode forms an MOS capacitor with the silicon substrate, which makes it possible to store electrical charges.

The slight interval separating the capacitors—since the CCDs are realized using integrated circuit technology—creates a coupling among them such that a potential difference applied between two adjacent capacitors induces an electrical field which displaces the charges from one capacitor to the other. Successively applying voltages having opposite phases in alternation to the electrodes displaces the charges incrementally to a collector at which the reading of the signal is performed.

The data or charges stored can be injected by photoelectric action. In effect, when the silicon is irradiated by visible or near-infrared light, electron/hole pairs are created, by detection of the incident photons. The charge carriers thus created in the photodiodes are localized in the MOS capacitors of the device under the influence of the voltages applied to the electrodes. The quantity of integrated charges in each potential hole is proportional to the local illumination and makes it possible to obtain a sampled analog signal representative of the analyzed image.

READING CAN BE DONE SERIALLY OR IN PARALLEL

In linear photosensitive devices conceived for analysis systems that assure a line-by-line sweep by means of relative travel between the image and the pickup, a photodiode array is associated with two reading registers for charge transfer. One register reads the charges accumulated in the even photodiodes, and the other reads the charges accumulated in the odd photodiodes.

These devices necessitate two external control phases, since the other control signals are engendered by a logic circuit that is integrated on the integrated circuit chip of the CCD.

Nevertheless, using CCDs necessitates using peripheral circuits that assure different control functions: generation of clock signals, control of circuits for reading charges, and differential output amplification.

In the pocket-sized photocopying device according to the invention, the generation of clock signals is controlled by an incremental wheel which furnishes a pulse at each reading interval.

Although the majority of CCDs are designed to function with two-phase control signals, devices having three or four phases can contrarily be simpler to realize from the technological standpoint.

Figure 1:
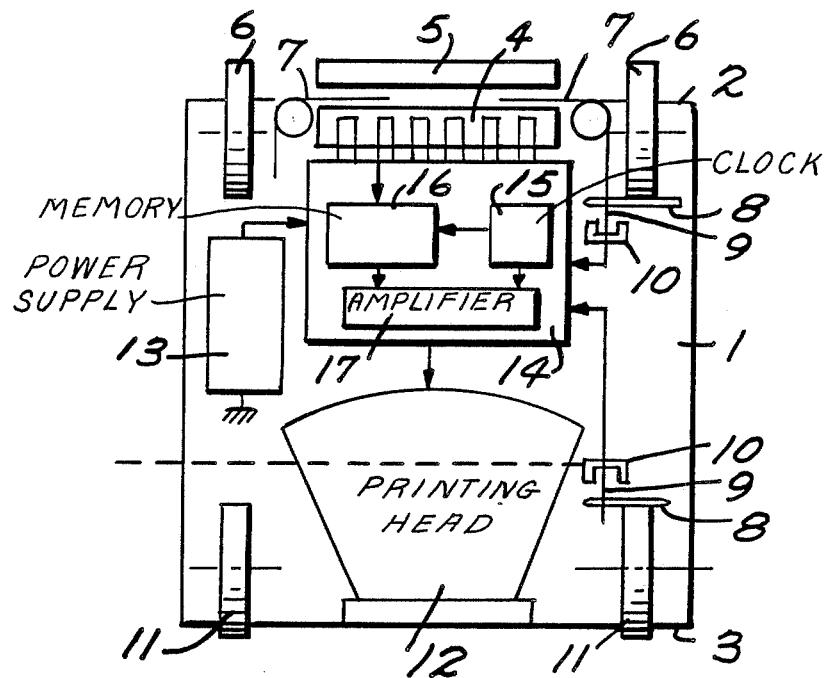
FIG. 1: a simplified diagram of the pocket-sized photocopying device according to the invention.

A simplified illustrtion of the pocket-sized photocopying device using a charge coupled device is shown in FIG. 1.

It is assembled on the inside of a package 1, preferably a flat package, but including at least two substantially plane faces 2 and 3, because the document to be photocopied and the base materials used in reproduction are generally flat. The first face 2 is the reading face, which carries the pickup, and the second face 3 is the writing face, which carries the printing head. These two faces may be adjacent, but preferably they are opposed to one another, such that reading is done with one end of the device and writing with the other, after the device has been turned over.

The reading face 2 includes an opening which corresponds to the photosensitive bar of the CCD circuit 4. A semicylindrical lens 5, placed facing the photosensitive bar, of small aperture, both supports the device on the document to be photocopied and provides spacing between the CCD and the document, so that the document can be illuminated. This spacing is warranted by the act that it is necessary to form an image of the document on the CCD; otherwise the reproduction would not be sharp.

At least one wheel 6—but preferably two wheels, because they facilitate displacement of the device while remaining parallel to it—is placed next to the CCD. The axis of the wheel 6 is parallel to the longitudinal axis of the CCD bar. The wheel is notched or is of elastomer, such that it rolls without sliding on the document.

Since commercially available CCDs have photosensitive bars with a length included between the figures of 13.3 and 26.6 mm, two shutters 7 which are moveable before the photosensitive bar make it possible to regulate the width of the area being photocopied; they are stopped down to a spacing of approximately 1 cm, if one line of text is to be photocopied, and opened to the maximum if a diagram or data table is to be photocopied.

To furnish a time base and to increment reading one interval at a time, the wheel 6 can for example rub at a tangent on a shaft 8 having a slight diameter, which provides a multiplication of the speed of rotation. The shaft 8 in turn drives an incremental disc 9, which for example includes magnetic regions and nonmagnetic regions. The passage of these regions before a proximity detector makes it possible to furnish a clock signal H which increments the reading of the document.

Any other device for transforming the rotational movement of the wheel 6 into a train of electrical clock signals H is equally suitable, without departing from the scope of the invention.

The writing face 3 also includes a wheel 11—but preferably two wheels, for the above reasons. At least one wheel 11 is equipped in the same manner as the wheel 6, such as to furnish the same time base when it rolls on the base reproduction material. The wheel 11 does not have to have the same diameter as the wheel 6; in this case the system 9-10 for encoding the electrical signal displacement is modified so that one writing interval on the wheel 11 corresponds to one reading interval on the wheel 6. However, the wheels 6 must each have the same diameter as each other, and the same applies for the wheels 11.

The second face 3 also includes a window, which enables printing by means of a dot matrix printing head 12, for example.

The interior of the package 1 of the device contains an energy source 13, for example a 12 or 15 V battery, the voltage being necessary to make a CCD function. However, this battery can advantageously be replaced with a small mains voltage adaptor; the fact that it is dependent on mains voltage and connected by means of a power cord is not an inconvenience in the majority of cases, and does not prevent the device from being pocket-sized.

A printed or hybrid circuit 14 substantially includes a clock 15, which furnishes all the control signals of the system, a read-write memory 16 and a circuit 17 for amplification and multiplexing to the cells of the matrix printer 12.

The details of this circuit will be described later.

Figure 2:
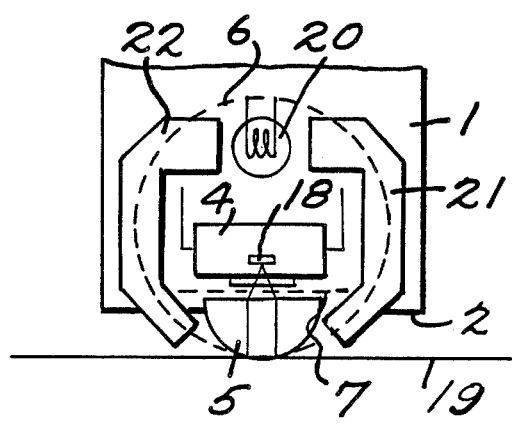
FIG. 2: a diagram of the reading end, in a plane perpendicular to the plane of the foregoing figure.

FIG. 2 provides a partial view, on a larger scale, of the pickup and reading face, in a plane that is perpendicular to the reading axis.

The integrated CCD circuit 4 is fixed on the interior of the package 1 against the face 2, in which a window corresponds in dimension and position to the photosensitive bar 18 of the CCD. A semicylindrical lens 5 is retained—by means not shown—a slight distance away from and before the window and the bar 18, such that the shutters 7, shown in broken lines, can slide in front of the bar in order to limit its useful length. The lens 5 is supported on the document 19 that is to be photocopied.

The cells of the CCD have dimensions on the order of 13×13 microns, but it is difficult for the thickness of the package of the device to be less than two cm toward the reading face 2, when a CCD integrated circuit is mounted in a package having a width of 1.5 cm. Consequently the document 19 to be photocopied is preferably illuminated, to improve contrast, although the CCDs have a very wide dynamic range, between 3500/1 and 5500/1.

An illumination system is shown in FIG. 2. It includes a light source 20, a small electric bulb located on the interior of the package 1. The light that is emitted is guided to the line of the document 19 that is read by the CCD by means of two light guides 21 and 22. These guides may be pieces of translucent polymer material such as methyl polymethacrylate of a suitable shape, or as shown, provided with faces that act as a mirror, for guiding the light to the document that is being read. The guides may also be a bundle of optical fibers. Other solutions known to one skilled in the art may be used without departing from the scope of the invention.

The face 2 of the device is therefore elongated by a few mm—approximately 2 to 5 mm—and so it is necessary for the lens 5 to define a reading field having a width greater than the width of the photosensitive bar 18 and that it form an image of the document 19 on this bar. Otherwise, the bar encompasses a larger region of the document, because of the spacing between the document 19 and the bar 18.

The wheel 6 is shown in broken lines. It is preferable for the wheel to be aligned with respect to the lens 5 such that these two parts will be in contact with the document 19 along one and the same generatrix. This guarantees that no matter what the inclination of the device with respect to the document, the wheel will be in contact, will rotate, and will generate a time base.

Figure 3:
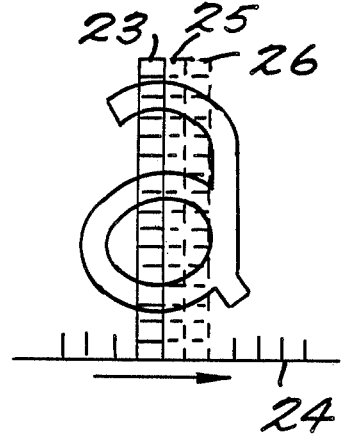
FIG. 3: the mode of reading a document via a linear CCD bar.

The mode of picking up and reading the document by the device according to the invention is shown in FIG. 3. Reading is done by displacement of the CCD reading head before the document, so that it traces a line. Scanning of a diagram is done by columns, each column such as 23 corresponding to the image received by the CCD bar 18, and with an incremental interval; the scale of the interval is shown at 24. The data of each cell of the bar 18, which define the diagram portions in one column 23, are transferred into memory at each interval 24.

Instead of using a linear CCD that includes only one photodiode array, a matrix CCD can also be used, which includes a photosensitive region comprising a plurality of photodiode arrays; matrix pickups having 576 lines, each including 384 elementary points, do exist.

In this case, the pickup and reading of the document is done block by block, and the transfer into memory of the data of one block of columns such as 23, 25, 26 is done along an interval that corresponds to that of the columns. For example, the contents of each column are transferred in parallel to memory, but the columns are transferred serially: column 23, then column 25, and then column 26, if reading is done with a sweep movement from left to right.

Figure 4:
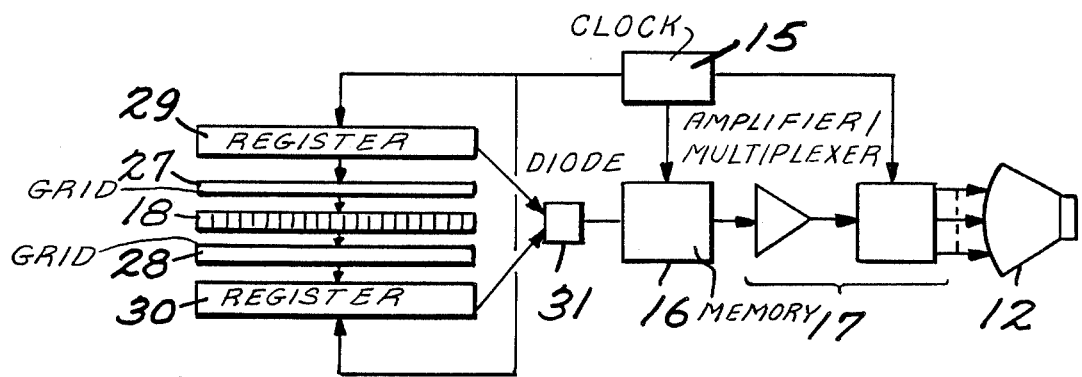
FIG. 4: a simplified electrical diagram of the pocket-sized photocopying device.

FIG. 4 shows the block circuit diagram of the device according to the invention.

The photosensitive array of the CCD bar 18 includes a plurality of photoelements—for example, 1728—each of them comprising an n-p photodiode covered by a layer of silicon, associated with an MOS capacitor which accumulates the electrons created by the illumination. The quantity of charges accumulated is proportional to the illumination received and to the integration time. On each side of the photosensitive array, one transmission grid 27 or 28 isolates the photosensitive array 18 of the reading registers 29 or 30 by way of a potential barrier. The opening of this barrier enables parallel transfer of the charges accumulated in the photosensitive zone to the reading registers.

The charge packets emitted by each register are multiplexed in a shared reading diode 31, which assures the conversion of charge into voltage. Between each arrival of a packet of charges, the potential of the reading diode 31 is fixed at a reference level by an MOS transistor for resetting to the level controlled by the clock 15, which in turn is controlled by the incremental wheel 6.

The potential of the reading diode 31 is applied to the input of a read-write memory 16 having a serial input, under the control of the clock 15.

This process includes parallel aquisition, with parallel transfers to the registers 29 and 30, and then serial inscription into the memory 16. Other processes are equally possible, depending on the configuration of the CCD integrated circuit used; the inscription of the contents of the registers 29 and 30 may equally well be done in parallel into the memory 16, but this method is limited by the number of available memory connections.

For reading the contents of the memory 16, that is, printing them onto a base reproduction material, may means of the matrix printer 12, the signals coming from the memory must be amplified. Parallel reading of the contents of time memory is impossible, because of the great number of elementary points of the photosensitive bar 18, which would necessitate the same number of amplifiers so as to keep the same matrial in both reading and writing.

This is why the signals coming from the memory 16 are read serially, and then amplified by a single amplifier-multiplexer 17, before being sent to matrix printer 12. The fact that the signals are serially read introduces a temporal shift between them, which is reflected in the actuation of the pins, if the printer is of the pin, i.e., dot matrix type. However, reading of a memory and multiplexing it at frequencies of several megahertz is known, so that the shift in the actuation of the pins is imperceptible on the document reproduced in this way.

Figure 5:
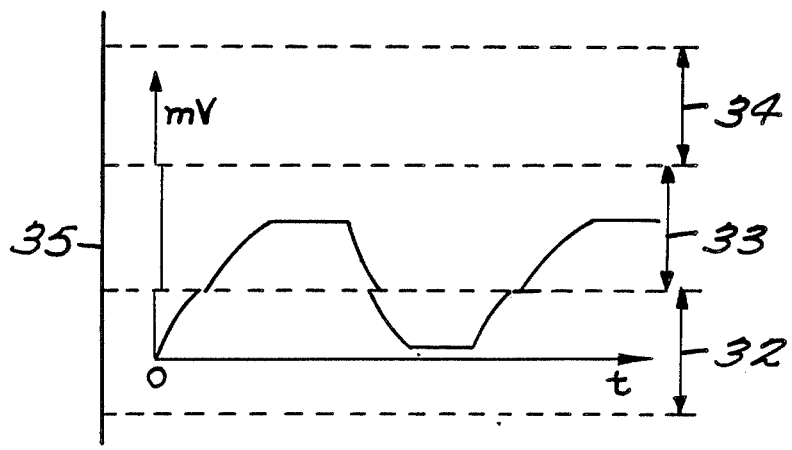
FIG. 5: the mode of reading a document of larger dimensions than the length of the window of the CCD bar.

FIG. 5 represents the mode of reading a document of larger dimensions than the length of the photosensitive CCD bar.

It is assumed for example that a diagram is to be photocopied, providing the variation of a voltage as a function of time. Very generally, such diagrams—or any other graphic illustrations—have an ordinate axis having dimensions greater than 13.3 or 26.6 mm, which are the present lengths of CCD bars. Thus in order to reproduce this diagram or graph, it is necessary to make several sweeps over the image. A first sleep of the photocopying device, with the shutters 7 open to the maximum, enables acquisition of a first area 32 of the diagram, a second sweep enables aquisition of a second area 33 of the diagram, and so forth, until the entire image has been read.

If the reproduction is to be good and the dlfferent areas acquired are to be in proper alignment with one another, it is necessary that they have the same origin. This is obtained by tracing a line 35 which is very well defined and quite black, at the left of the diagram if the sweep takes place from left to right. This line will be read by the CCD pickup and will furnish an origin signal for the image. Thus the lack of definition in the course of the reproduction will at maximum be one reading interval—24, in FIG. 3—and hence less than one width of the line 35, as shown in FIG. 5.

Figure 6:
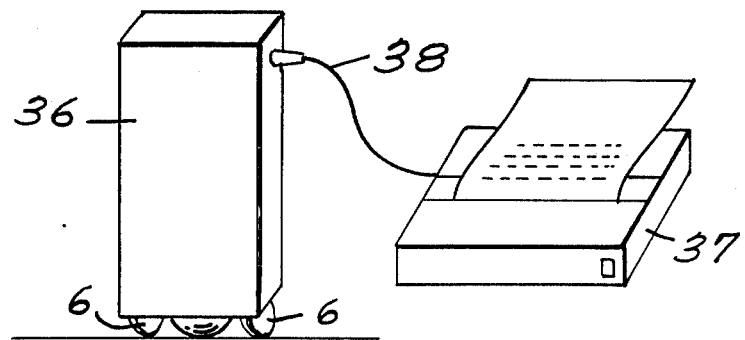
FIG. 6: a variant embodiment of the pocket-sized photocopying device.

Finally, FIG. 6 shows a variant of the photocopying device according to the invention.

In the device as it has been described, the bulkiest and heaviest part is the electromechanical matrix printer, although the performance of this printer is inferior to the performance of the purely electronic portion of the device. Integrated CCD circuits including a linear bar with 2048 photodiodes, and integrated memory circuits having 64 kbits and more, are known, which enables very high fidelity in reproduction. However, a pocket-sized matrix printer having 2048 pins, for example, is not presently known.

This is why a variant of the invention, as shown in FIG. 6, comprises an embodiment of a pickup and reading device 36 connected to a small matrix printer 37 by a cord 38.

In this variant, the reading device 36 includes the entire electrical portion such as has been described, with the exception of the printer 12; that is, it includes an integrated CCD circuit 4, power supply 13, clock 15, memory 16, amplifier-multiplexer 17 and of course the time base system established be the wheel 6.

The pocket-sized printer 37 is a small commercially available matrix printer, for example using a thermal bar. The definition of thermal printers is on the order of 10 points per millimeter.

Since the photocopying device is no longer displaced on the base reproduction material, in the present variant, the advancement of the paper in the printer 37 must be incremented. This is obtained by displacing the reading device 36 on a neutral base material, for example, a sheet of white paper. The wheel 6, in its rotation, generates a time base, which makes It possible to increment the advancement of the paper in the printer 37, and at the same time controls the reading of the contents of the memory 16.

The pocket-sized photocopying device according to the invention is used for pickup and copying of portions of literary or scientific texts, graphs or diagrams, when photocopying of the text in its entirety is not desired.

The description herein is not limiting of one scope of the invention, which may be realized by other equivalant means apparent to one skilled in the art. Within the spirit of the invention, the invention is defined by the following claims.

We claim:

1. A pocket-sized device for photocopying, on a reproduction base material, parts of texts or diagrams by linear displacement of the device with respect to a document, comprising:
    at least two incremental wheels, wherein a first wheel rolls without sliding on the base material of the document to be reproduced and a second wheel rolls on the reproduction base material, the rotation of said wheels furnishing a time base for the acquisition and restoration of data;
    a matrix pickup for picking up and reading the part of the document to be reproduced;
    an electronic device for inputting data from the matrix pickup serially into a memory;
    a means for amplifying and multiplexing the data output from the memory;
    a matrix printing system controlled by the amplifier-multiplexer the matrix pickup and the matrix printing system having the same matrix arrangement;
    a clock controlled by the time base, furnished by the rotation of said incremental wheels, said clock controlling the transfers, at each clock interval, of data acquired by the pickup to the memory in the course of the reading cycle, and then from the memory to the printing system in the course of the printing cycle.

2. A pocket-sized photocopying device as defined by claim 1, wherein the device is contained in a package, said package comprising:
    at least two substantially plane faces not adjacent to one another, the first face, being the reading face, supporting the pickup for reading and said first wheel, the second face, being the writing face, supporting the matrix printing system and said second wheel.

3. A pocket-sized photocopying device as defined by claim 2, wherein the matrix reading pickup is a linear charge coupled device.

4. A pocket-sized photocopying device as defined by claim 3, wherein the electrical signal data coming frm the CCD is transferred serially or in a parallel into a read-write memory for storage and are then transferred serially to the amplifier-multiplexer, and addressed to the matrix printing system.

5. A pocket-sized photocopying device as defined by claim 4, wherein the transfer of the reading dta from the CCD to the memory is controlled at each reading interval by the rotation of the first incremental wheel supported on the reading face of the package of the device.

6. A pocket-sized photocopying device as defined by claim 4, wherein the transfer of the data stored in memory to the matrix printing system is controlled by the rotation of the first incremental wheel located on the writing face of the package of the device, said wheel having the same writing interval as the reading interval of the wheel located on the reading face.

7. A pocket-sized photocopying device as defined by claim 1, further comprising a semicylindrical lens, placed before the window of the pickup which focuses the image of the document to be reproduced on the pickup and creates a space between the document and the pickup that enables illumination of the document.

8. A pocket-sized photocopying device as defined by claim 7, wherein a light source, placed on the interior of the package of the device, is associated with at least one light guide for the illumination of the area of the document to be reproduced.

9. A pocket-sized photocopying device as defined by claim 1, wherein the matrix printing system is an electromechanical dot matrix printer.

10. A photocopying device as defined by claim 1, wherein the matrix printing system is an electromechanical matrix printer, connected by an electrical conductor cord to the package containing reading devices and data processing devices.

11. A pocket-sized device for photocopying parts of texts or diagrams on a reproduction base material, by linear displacement of the device with respect to a document, comprising:
    at least two incremental wheels wherein a first wheel rolls without sliding on the base material of the document to be reproduced and a second wheel rolls on the reproduction base material, the rotation of said first and second wheels furnishing a time base for the acquisition and restoration of data;

a matrix pickup, having a window, for picking up and reading the part of the document to be reproduced.

an electronic device for inputting data coming from the matrix pickup serially into a memory;

a means for multiplexing the data output from the memory;

a matrix printing system controlled by the amplifier-multiplexer, the matrix pickup and the matrix printing system having the same matrix arrangement;

a clock controlled by the time base, furnished by the rotation of said incremental wheels, said clock controlling the transfers, at each clock interval, of data acquired by the pickup to the memory on the course of the reading cycle, and then from the memory to the printing system in the course of the printing cycle; and at least one shutter placed before the window of the pickup, the shutter being movable to adjust the width of the photocopied area on the document to be reproduced to a desired width.

* * * * *